(12) United States Patent
Le et al.

(10) Patent No.: US 6,354,326 B1
(45) Date of Patent: Mar. 12, 2002

(54) TOILET FILL VALVE WITH IMPROVED NOISE ABATEMENT

(75) Inventors: Tuan Van Le, Diamond Bar; Christopher A. Coppock, Laguna Niguel, both of CA (US)

(73) Assignee: Fluidmaster, Inc., San Juan Capistrano, CA (US)

( * ) Notice: Subject to any disclaimer, the term of this patent is extended or adjusted under 35 U.S.C. 154(b) by 0 days.

(21) Appl. No.: 09/152,750

(22) Filed: Sep. 14, 1998

(51) Int. Cl.[7] .......................... F16K 47/02; F16K 31/34
(52) U.S. Cl. ................ 137/436; 137/218; 137/414; 137/429; 137/443; 138/42; 251/126
(58) Field of Search ................................. 137/217, 218, 137/414, 432, 436, 442, 443, 444, 437, 429; 138/37, 42, 43; 251/126, 127

(56) References Cited

U.S. PATENT DOCUMENTS

| | | | | |
|---|---|---|---|---|
| 1,497,796 A | * | 6/1924 | Sherwood | 251/126 |
| 1,571,604 A | * | 2/1926 | Ryan | 251/126 |
| 1,787,601 A | * | 1/1931 | Swanberg | 137/436 |
| 1,901,633 A | * | 3/1933 | Clemmons | 137/436 |
| 2,017,799 A | * | 10/1935 | Helfrich | 251/126 |
| 2,105,314 A | * | 1/1938 | Duncan et al. | 251/126 |
| 2,283,945 A | * | 5/1942 | Peterson et al. | 137/444 |
| 2,738,851 A | * | 3/1956 | Warch | 137/436 |
| 3,096,068 A | * | 7/1963 | Claridge et al. | 137/436 |
| 3,516,094 A | * | 6/1970 | Reagan | 137/436 |
| 3,669,138 A | * | 6/1972 | Schoepe et al. | 137/218 |
| 3,930,516 A | * | 1/1976 | Flinner et al. | 137/436 |
| 4,338,964 A | * | 7/1982 | Schoepe | 137/443 |
| 4,600,031 A | * | 7/1986 | Nestich | 137/218 |
| 5,280,803 A | * | 1/1994 | Swift et al. | 137/443 |
| 5,738,141 A | * | 4/1998 | Blanke et al. | 137/443 |

FOREIGN PATENT DOCUMENTS

GB 400810 * 11/1933 ............. 137/436

* cited by examiner

Primary Examiner—George L. Walton
(74) Attorney, Agent, or Firm—Richard L. Myers; Myers, Dawes & Andras

(57) ABSTRACT

A toilet fill valve includes a housing defining a water fill passage and a water inlet. A valve disposed in the passage divides the housing into a upstream portion and a downstream portion. A pressure regulator vertically oriented in the downstream portion of the housing has a spiral configuration providing a significant pressure drop in the water flow. Noise abatement is enhanced by pressure regulation which reduces the flow velocity, flow directors which inhibit turbulence, and energy drops provided in a downspout.

26 Claims, 6 Drawing Sheets

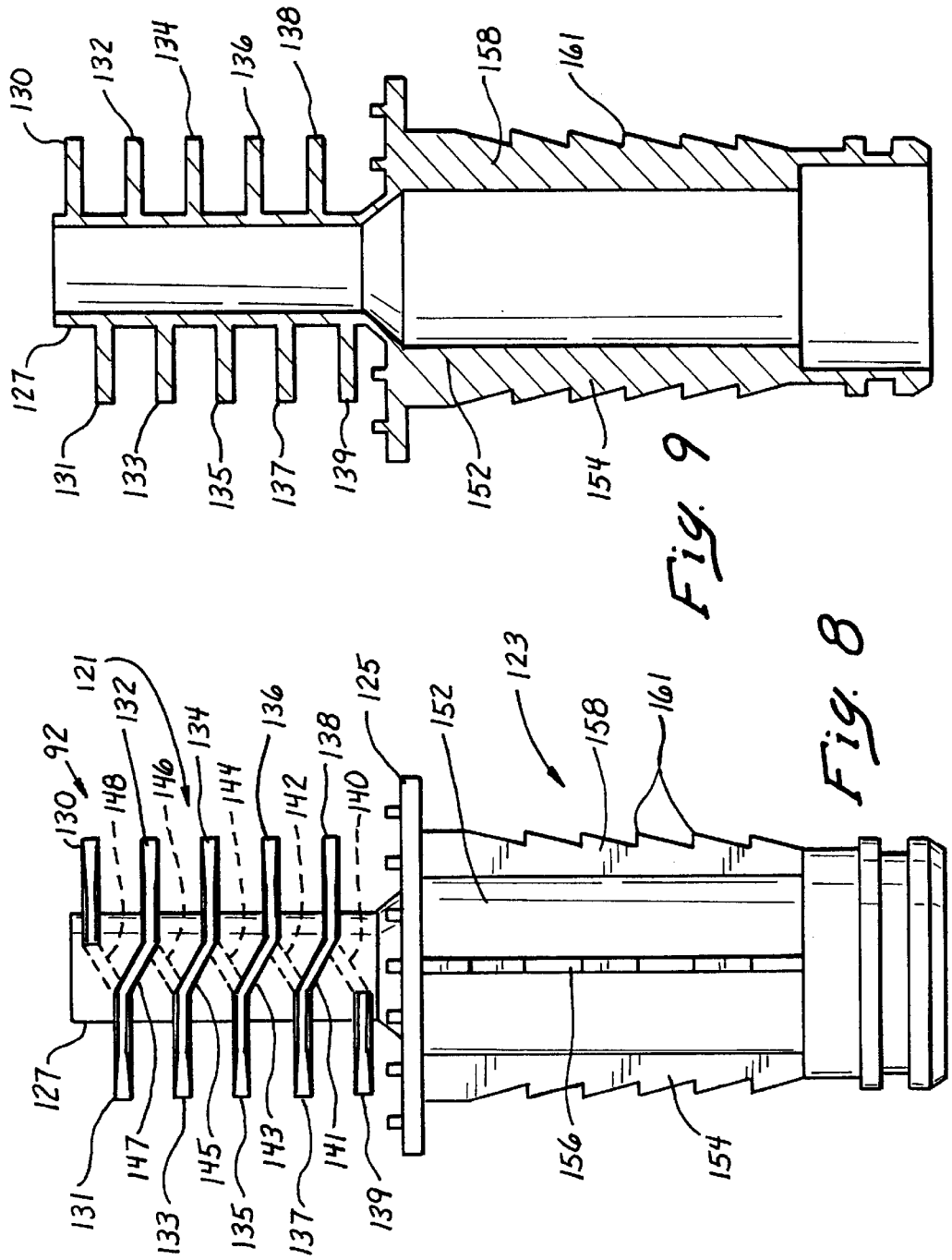

TOILET FILL VALVE WITH IMPROVED NOISE ABATEMENT

FIELD OF THE INVENTION

This invention relates generally to toilets, and more specifically, to valves for filling a toilet tank with water.

DISCUSSION OF THE PRIOR ART

A common toilet configuration includes a toilet bowl and a tank providing a reservoir of water for flushing the bowl. Fill valves are typically positioned within the tank and adapted to receive water from an external source to refill the tank following the flushing operation. These fill valves typically include a housing having a water flow passage and an inlet for the water. A valve is disposed in the water flow passage between the water inlet and a downspout which forms a water outlet into the tank. The valve is operated by a float mechanism to provide for a controlled refilling of the tank following the flushing operation.

In the past, pressure regulators have been provided on the inlet side of the valve in order to control the pressure of the water within the water flow passage. Since this passage has typically had a horizontal configuration leading to the valve, the pressure regulator has been oriented to extend horizontally within the passage. This has required an increased size of the housing and further required that the housing extend a significant distance into the tank.

Since the downspout is typically vertically oriented, the water in the past has tended to cascade downwardly with a high degree of velocity and turbulence. This has resulted in the water crashing to the bottom of the tank with a considerable volume of noise. This sound has been particularly annoying, so various attempts have been made to insulate the walls of the tank in order to capture the noise within the tank.

It is always of interest to reduce the volume of noise associated with the flushing of a toilet and the subsequent refilling of the water tank. In the case of a fill valve, this noise is generally attributed to water velocity and turbulence as well as water streams impinging on transverse surfaces. The noise is generally of two types. A first type is transmitted through the air and is commonly referred to as "air noise." A second type of noise is transmitted by vibration through solid objects such as the valve housing and pipes associated with the plumping. This noise is commonly referred to as "pipe noise." In the past, water has been directed through glass bead reservoirs in an attempt to slow the water velocity and abate some of the noise. Dampeners have also been used on pipes and tubes in an attempt to absorb vibration. These attempts have had only a limited affect on the air and pipe noise associated toilet fill valves.

SUMMARY OF THE INVENTION

These deficiencies of the prior art are overcome with the present invention, one embodiment of which requires the pressure regulator to be disposed in the outlet portion of the water flow path. Thus positioned, the pressure regulator is disposed on the side of the valve opposite the water inlet. The housing of the valve includes inlet portions which are adapted to be mounted in a generally horizontal orientation, and outlet portions which are adapted to be mounted in a generally vertical orientation. In this embodiment, the pressure regulator extends into the outlet portions of the housing and into the downspout. With this configuration, no pressure regulator need be provided in the horizontal portions of the housing so the width of the valve can be maintained at a minimal dimension. This enables the fill valve of the present invention to be mounted in close proximity to the wall of the toilet tank.

The pressure regulator preferably includes stepped cylinders defining the inside diameter and a spiral structure with a plurality of parallel radial flanges defining the outside diameter. This configuration greatly facilitates manufacture of the pressure regulator by a molding process. The spiral structure is operatively positioned in the vertical portions of the housing. Forcing the water to flow upwardly in the vertical spiral structure enables gravity to facilitate pressure regulation of the water. Extending axially of the spiral portions is a mounting projection which includes a plurality of teeth angled to facilitate insertion into the downspout and inhibit removal from the downspout.

The noise associated with a fill valve is due primarily to the water flow characteristics. Water having a high velocity and a high degree of turbulence generates considerable noise as it passes along a flow path. The pressure regulator associated with the present invention significantly reduces the velocity of the water and various flow directors reduce the turbulence. In addition, the combination of the pressure regulator and the downspout has been provided with several diameter enlargements, each of which produces an energy drop. As a result, a high degree of laminar flow is achieved with a significantly reduced velocity. The resulting noise abatement, even that resulting from water impinging directly on the perpendicular bottom surface of the tank, renders the fill valve of the present invention almost silent in operation.

In one aspect of the invention, a toilet fill valve having a water flow passage includes a housing defining a portion of the passage. A valve is disposed in the passage of the housing and divides the housing into an upstream portion and a downstream portion. A pressure regulator is disposed in the downstream portion of the housing where it provides a pressure drop in the housing on the side of the valve opposite the water inlet. The pressure regulator forms with a downspout an expansion step facilitating laminar flow within the downspout.

In another aspect of the invention, the pressure regulator includes a spiral structure having an axis and being configured to form the water flow passage into the shape of a spiral. A first flange included in the spiral structure is oriented generally in a first radial plane while a second flange included in the spiral structure is oriented generally in a second plane. A ramp included in the spiral structure extends transverse to the axis of the first plane and the second plane. The pressure regulator also includes a mounting projection which extends into the downspout and forms with the downspout an expansion step facilitating laminar flow within the downspout.

In a further aspect of the invention, a toilet includes a tank providing a reservoir for flushing a toilet. A fill valve is disposed to provide a controlled release of water into the tank following flushing of the toilet. The fill valve includes a housing and a valve disposed in a water flow passage of the housing to control release of water into the tank. A downspout extending between the valve and the tank includes portions defining an expansion step which produces substantially laminar flow within the downspout. Tank water in the downspout creates a back pressure which further facilitates the laminar flow of the fill water.

These and other features and advantages of the invention will become more apparent with a discussion of preferred embodiments of the invention and reference to the associated drawings.

DESCRIPTION OF THE DRAWINGS

FIG. 8 is a side elevation view of a pressure regulator associated with the fill valve of the present invention; and FIG. 9 is an axial cross-section view of the pressure regulator illustrated in FIG. 8.

DESCRIPTION OF PREFERRED EMBODIMENT AND BEST MODE OF THE INVENTION

Figure 1:
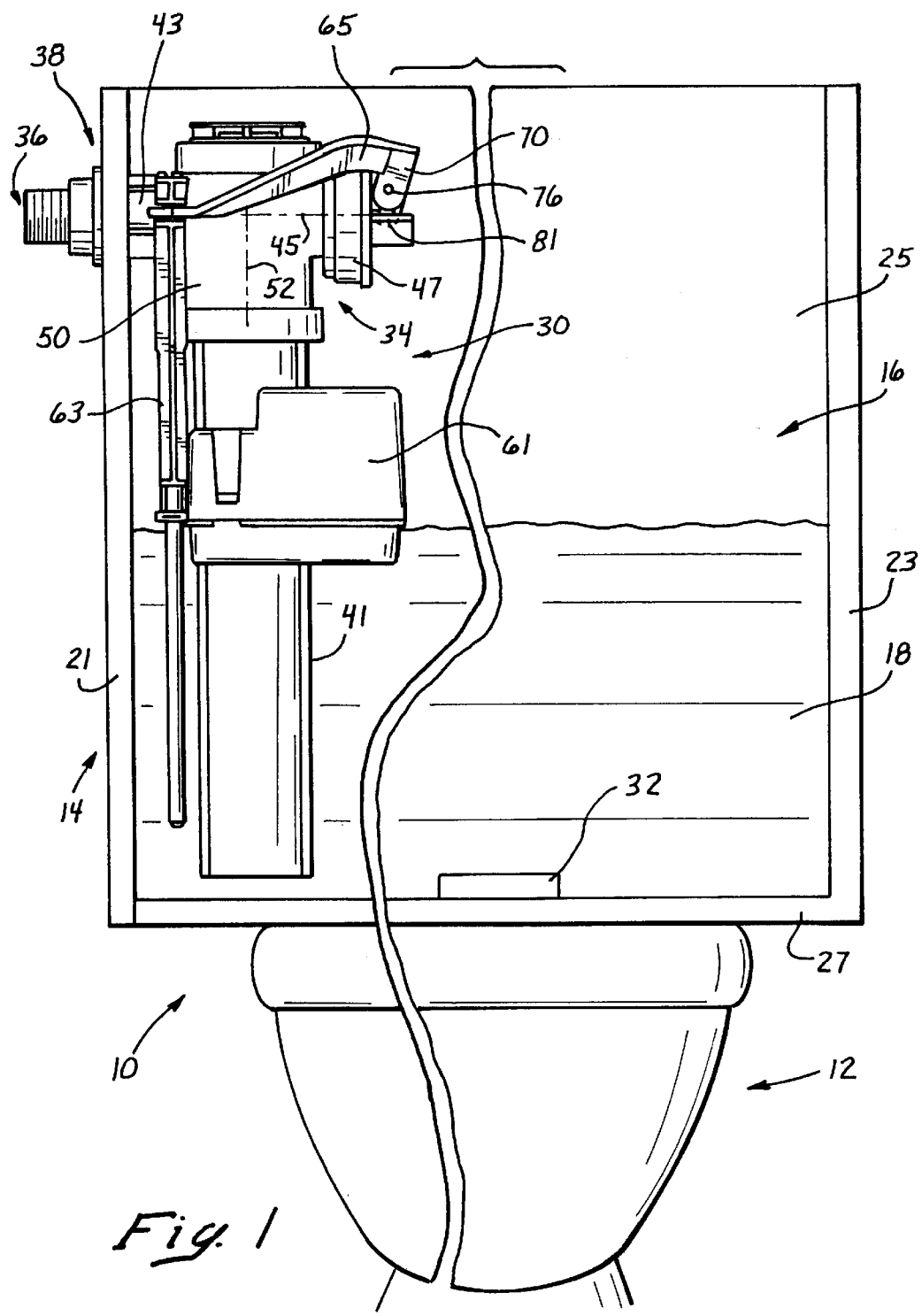
FIG. 1 is a front elevation view of a toilet including a bowl and a tank with a fill valve of the present invention.
Figure 2:
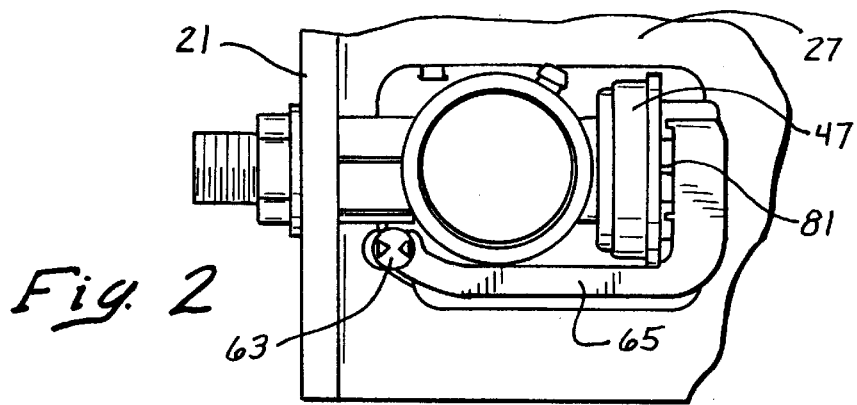
FIG. 2 is a top plan view of the toilet fill valve.

A toilet is illustrated in FIG. 1 and designated generally by the reference numeral 10. The toilet 10 is of the type which includes a bowl 12 and a tank 14 which provides a reservoir 16 for water 18. In this case, the tank 14 is formed by a pair of sidewalls 21 and 23, a back wall 25, a bottom wall 27 and a front wall (not shown). A fill valve 30 of the present invention is mounted within the tank 14 and adapted to receive water from an external source (not shown) through the sidewall 21. In operation, the toilet 10 is flushed by operation of a flush valve 32 which releases the water 18 from the reservoir 16 into the bowl 12. During and following this flushing operation, the fill valve 30 provides for a controlled release of water from the external source (not shown) into the reservoir 16 in order to refill the tank 14 prior to the next flushing operation.

The fill valve 30 in the illustrated embodiment includes a housing 34 which defines a water flow passage 36 that extends from an inlet 38 into a downspout 41. In this embodiment, the housing includes an inlet portion 43 that extends generally horizontally along an axis 45 to a valve 47. On the other side of the valve 47, the water flow passage 36 is defined by an outlet portion 50 which extends generally vertically along an axis 52 into the downspout 41.

Figure 3:
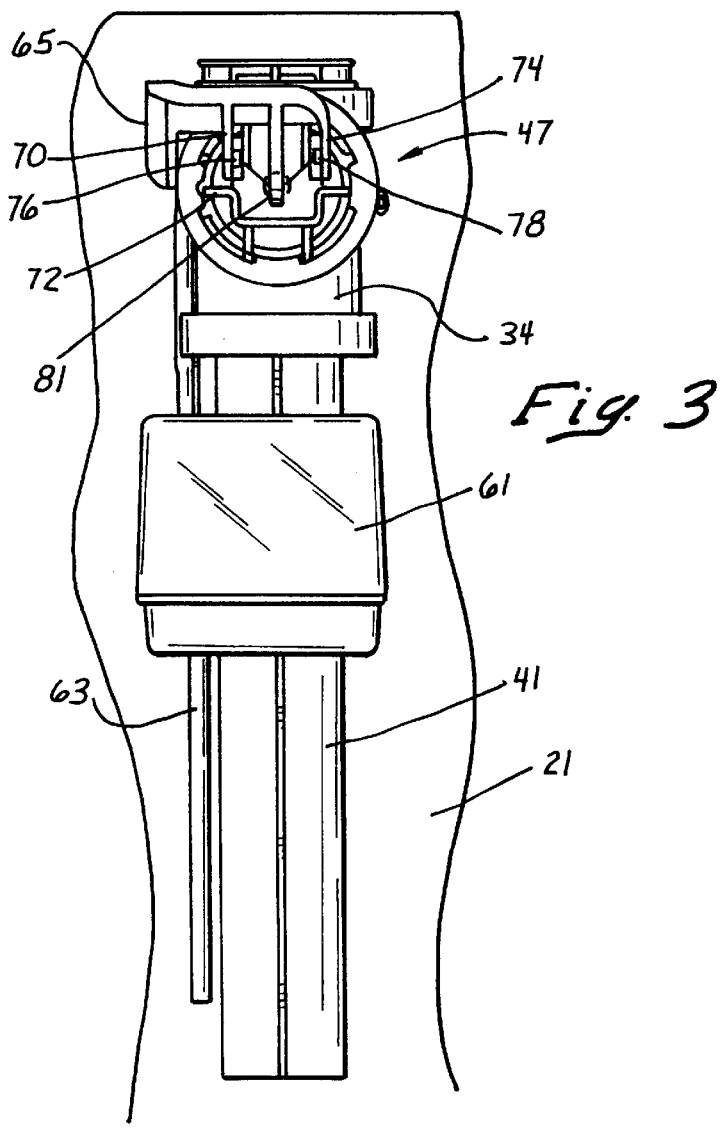
FIG. 3 is a side view of the toilet fill valve.
Figure 7:
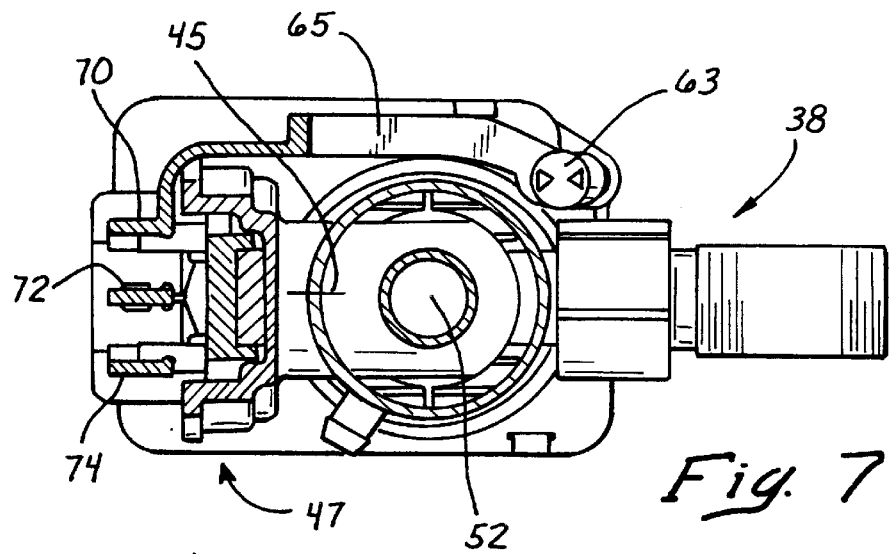
FIG. 7 is a cross-section view taken along lines 6—6 of FIG. 4.
Figure 4:
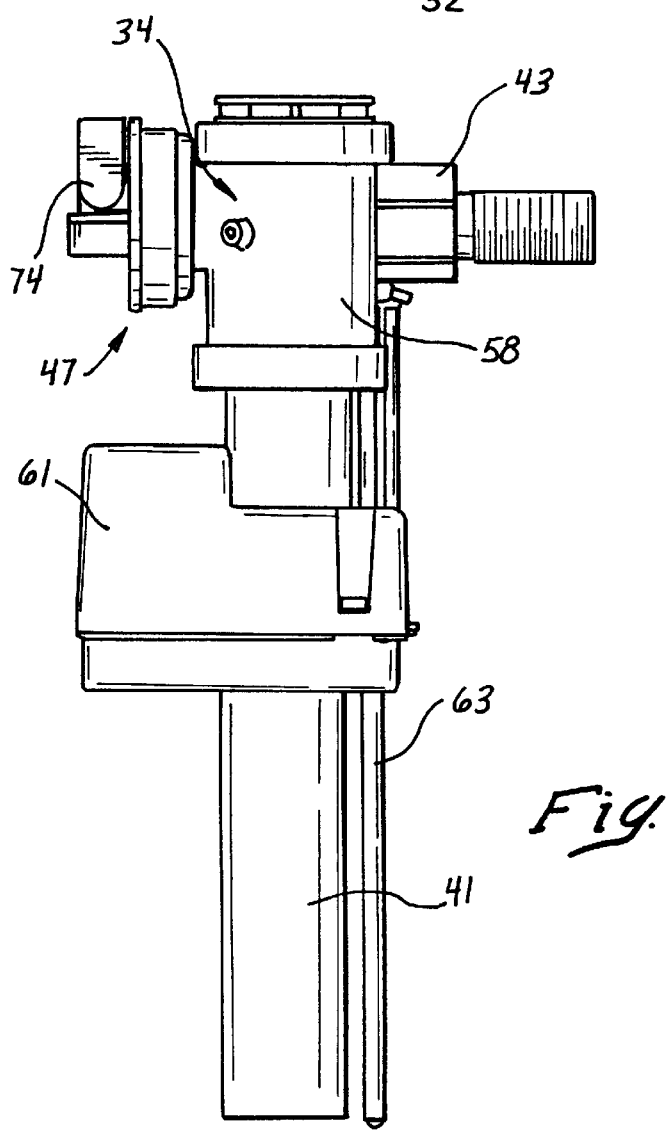
FIG. 4 is a back elevation view of the toilet fill valve of the present invention.

A float 61 is carried by the surface of the water 18 as it slides on the downspout 41 along the axis 52. The float 61 is connected to an adjustable shaft 63 which is in turn coupled to an arm 65 associated with the valve 47. In operation, the float 61 descends along the downspout 41 as the surface of the water 18 drops in the tank 14. The adjustable shaft 63 descends with the float 61 and causes the arm 65 to pivot downwardly. Operation of the arm 65 is best illustrated in FIG. 3 where the arm 65 is illustrated to engage the valve 47 with three flanges 70, 72 and 74. The flanges 70 and 74 each include a fulcrum tab 76 and 78, respectively, about which the arm 65 pivots. With this pivotal movement, the flange 72 moves a pin 81 into and out of the valve 47 in a known manner. As the arm 65 pivots downwardly with a descending float 61, the pin 81 is forced outwardly to open the valve 47 and permit fluid communication between the inlet portion 43 and the outlet portion 50 of the housing 34. As the arm 65 pivots upwardly with ascending float 61, the pin 81 is forced inwardly to close the valve 47 and inhibit fluid communication between the inlet portion 43 and the outlet 50 of the housing 34.

Figure 5:
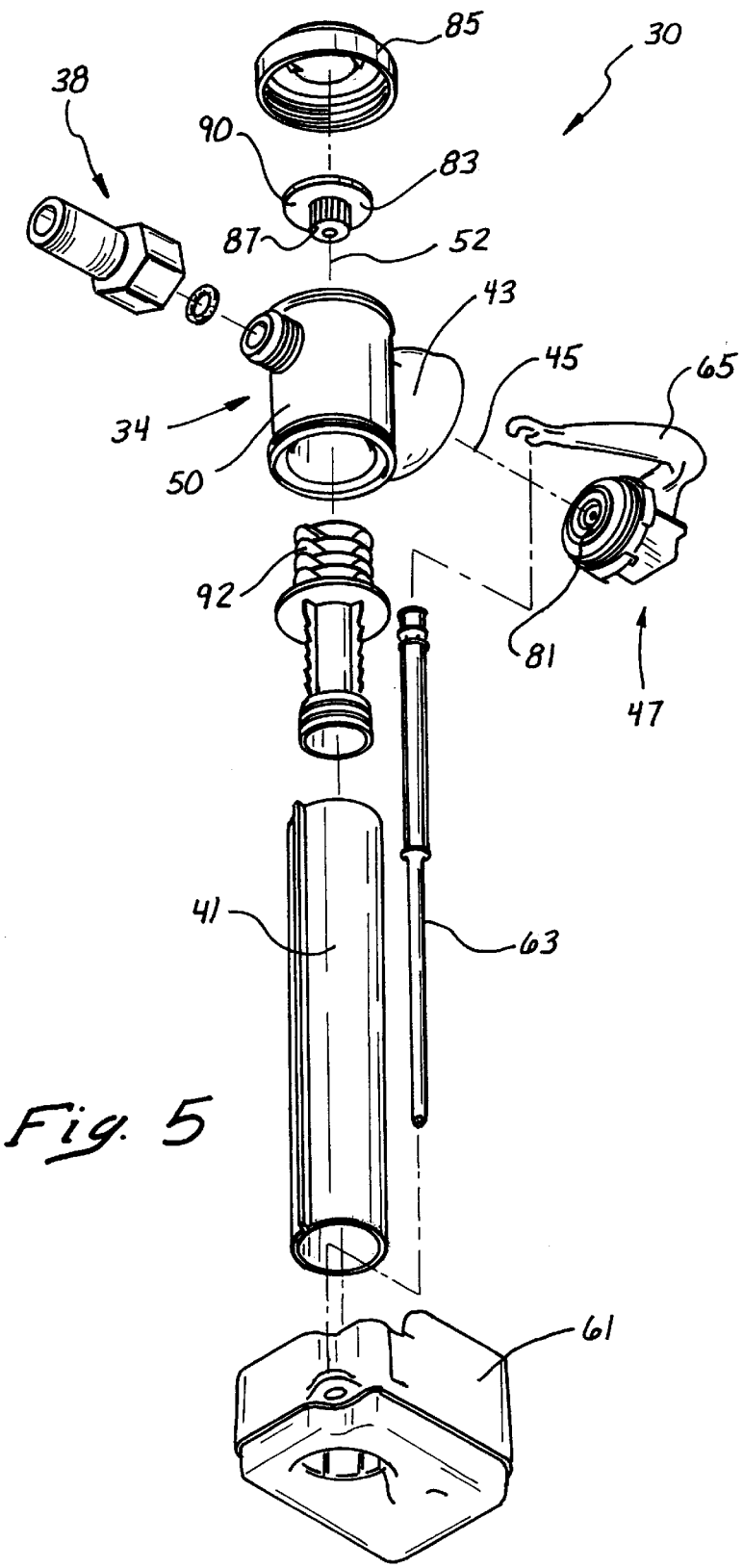
FIG. 5 is an exploded view of the toilet fill valve of the present invention.

Some of the interior components of the fill valve 30 are best illustrated in the expanded view of FIG. 5. These components include an antisiphon insert 83 which is mounted in the top of the housing 34 and covered with a cap 85. The insert 83 includes a flange structure 87 which extends generally axially from an annulus 90. The interior components of the valve 30 also include a pressure regulator 92 which will be discussed in greater detail below. The insert 83 and associated cap 85 form an air gap 94 best illustrated in FIG. 6.

This structure functions as an air gap because the insert 83 is free to move vertically within the valve 30. When water is flowing through the valve 30, the insert 83 is formed against the cap 85 and forms a seal preventing water loss through the air gap 94. However, when water is not present in the valve 30, the insert 83 drops providing fluid communication through the air gap 94 and thereby preventing the siphoning of water through the valve 30.

Figure 6:
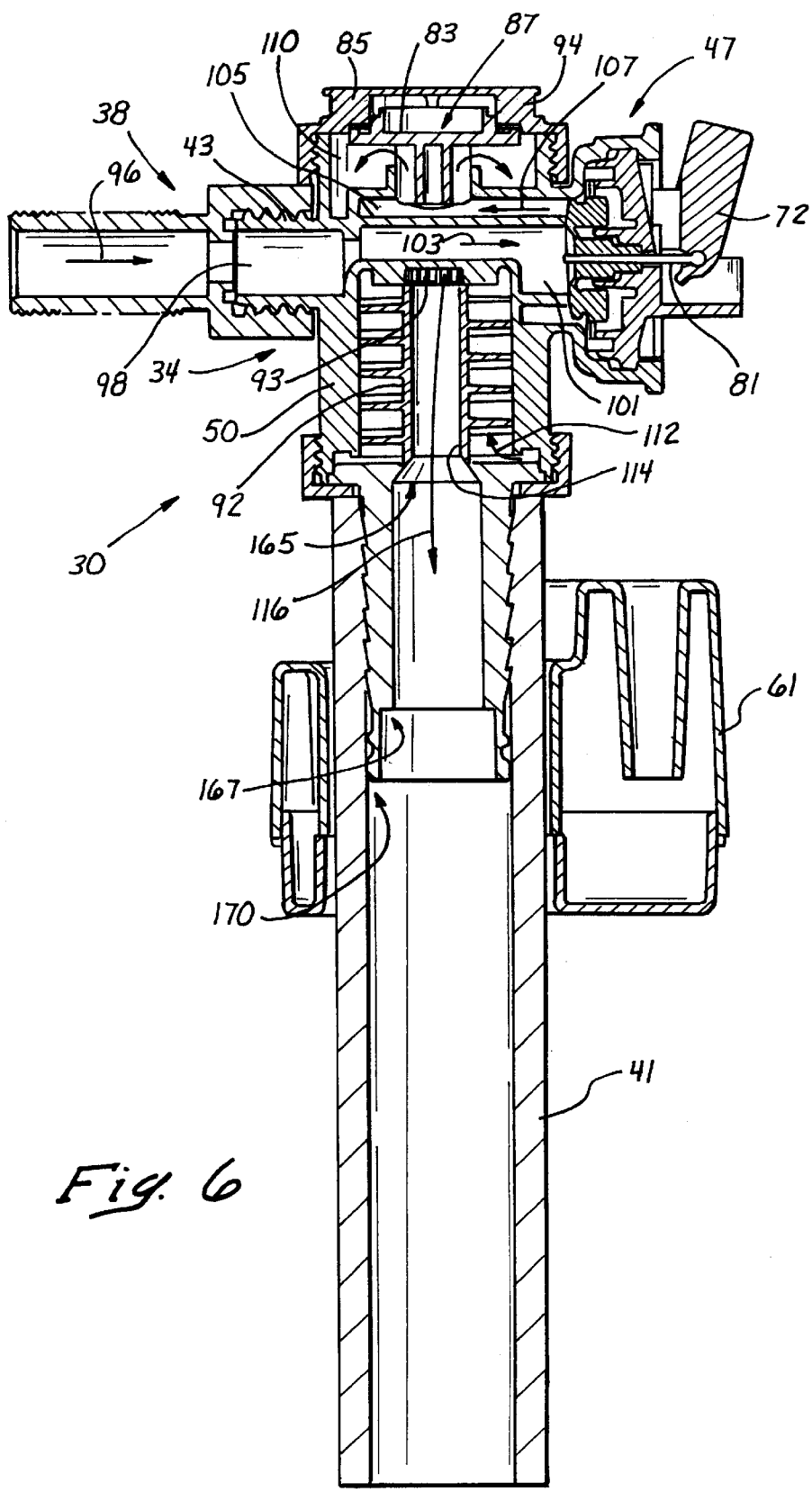
FIG. 6 is an axial cross-section view of the toilet fill valve of the present invention.

FIG. 6 is also best suited for discussing flow of the water 18 within the valve 30. Initially, the water 18 enters the valve 30 through the inlet 38 as illustrated by an arrow 96. From the inlet 38, the water flows into a water flow passage 98 including an inlet passage 101 which extends to the valve 47. This water flow is best illustrated by an arrow 103.

Beyond the valve 47, the water flow passage 98 is defined by an outlet passage 105 where the water flow is indicated by an arrow 107. From this outlet passage 105, the water 18 flows upwardly through the flange structure 87 of the insert 83 and into a cavity designated by the reference numeral 110. This cavity 110 extends to the bottom of the housing outlet passage 50 where it encounters the pressure regulator 92. From this position at the bottom of the housing 34, the water 18 flows upwardly in the pressure regulator 92 as illustrated by the arrow 112. At the top of the pressure regulator 92, the water encounters the deswirling blades 93 which extend vertically radially and substantially eliminate turbulence resulting from the swirling water flow. From the blades 93, the water descends into a central conduit 114 associated with the regulator 92. This water flow is represent by an arrow 116.

With reference to FIGS. 8 and 9, it will be noted that a preferred embodiment of the pressure regulator 92 includes a spiral structure 121 and a mounting projection 123 which is separated by an annular disk 125. As best illustrated in the axial cross-section view of FIG. 9, the spiral structure 121 includes an axial tube 127 and a plurality of annular flanges 130–139, which extend generally radially of the tube 127. These flanges 130–139 are staggered in a preferred embodiment and joined by a plurality of ramps 140–148 each of which extends between an opposing pair of the flanges 130–139 in the manner illustrated in FIG. 8. This configuration of the spiral structure 121 is of particular advantage as it greatly facilitates the process of molding the pressure regulator 92.

In operation, the spiral structure 121 provides a tortuous path for the water as illustrated by the arrow 112. This tortuous path lengthens the flow channel of the water increasing the energy losses along the walls of the path. These wall losses are further increased by the energy required to constantly turn the water around the spiral structure 121. In this manner energy losses resulting from the spiral structure produce a significant pressure drop and thereby provide the pressure regulation desired.

The vertical orientation of the pressure regulator 92 enables the structure to take advantage of gravity in regulating the pressure of the water 18. With a flow path beginning at the bottom of the spiral structure 121, and ending at the top of the structure 121, further regulation of the pressure is accomplished.

In the illustrated embodiment, the mounting projection 123 of the pressure regulator 92 includes a cylinder 152 which is coaxial with the cylinder 129 of the spiral structure 121. Extending radially outwardly of the cylinder 152 are several flanges 154, 156 and 158 each of which is provided with a plurality of teeth 161 which are configured to face toward the annulus 125 and spiral structure 121. This mounting projection 123 is sized and configured so that the flanges 154–158 form a high friction fit with the downspout 41, as best illustrated in FIG. 6. With the teeth 161 pointing in the direction of the spiral structure 121, mounting the projection 123 into the downspout 41 is facilitated while removal of the structure 123 from the downspout 141 is inhibited. Once the projection 123 is operably mounted, it actually forms part of the downspout 41 in defining the final configuration of the water flow passage.

It is thought to be of particular advantage that the vertical drop provided for the water 18 as it passes through the pressure regulator 92 and the downspout 41, includes several expansion steps such as those designated by the reference numerals 165, 167 and 170 in FIG. 6. Each of these steps is defined by a structure which increases in diameter in the downward direction. Thus, the expansion step 165 is defined by the inside diameter of the tube 127 which expands to the inside diameter of the tube 152. Similarly, the expansion step 167 is defined by an expansion of the inside diameter between the upper end of the tube 152 and the lower end of the tube 152. The expansion step 170 is defined by an increase from the inside diameter of the tube 152 to the inside diameter of the downspout 41. In each of these cases, the expansion steps 165–170 provide for a significant reduction in the energy of the water. With this reduction in energy, the velocity and turbulence of the water decreases significantly. As a result, the water emanating from the downspout 41 and contacting the wall 27 of the tank 14 exhibits substantially laminar flow. As the water passes into the reservoir 16, its laminar flow greatly reduces the noise associated with refilling the tank 14.

From the foregoing discussion it will be apparent that this embodiment of the invention provides for a vertical orientation of the pressure regulator 92. Furthermore, this regulator 92 is positioned on the outlet side of the valve 47 where it is disposed in the vertical outlet passage 50 of the housing 34. This structural configuration is particularly advantageous as it significantly reduces the horizontal width of the fill valve 30. As a consequence, the valve 30 can be maintained in close proximity to the side wall 21 of the tank 14.

Forming the spiral structure 121 of the pressure regulator 92 with a plurality of radial flanges is also thought to be of particular advantage. This greatly facilities the molding of this part thereby reducing the cost of manufacturer.

Having discussed in detail certain preferred embodiments of the invention, it will now be apparent that many alterations and improvements can be made to adapt the fill valve 30 to a particular environment. For example, the spiral structure 121 with the parallel flanges 130–139 can be disposed in a horizontal orientation in the inlet passage 43. Similarly, other spiral structures can be substituted for the illustrated embodiment and disposed in a vertical orientation in the outlet passage 50. Structures other than the flanges 154–158 and the teeth 161 can also be employed to hold the downspout 41 in a generally fixed relationship with the pressure regulator 92 or the housing 34. The expansion steps 165–170 could be provided generally anywhere along the water flow passage 36, although their disposition within the structures defining the final vertical drop of the water is preferred.

Pressure regulation in accordance with the present invention might also be accomplished with the water directed to fall downwardly through the spiral structure 121.

These and other variations are contemplated for the present invention. As a result, one is cautioned not to limit the concept only to the embodiments illustrated or described, but rather to determine the scope of the invention only with reference to the following claims:

What is claimed is:

1. A toilet fill valve having a water flow passage and being adapted for mounting on a toilet relative to a force of gravity, the toilet fill valve comprising:

a housing defining a water flow passage extending to a water outlet;

a water inlet communicating with the water flow passage in the housing;

a valve disposed in the water flow passage of the housing between an upstream portion of the housing and a downstream portion of the housing; and a pressure regulator disposed in the downstream portion of the housing and having a first flow channel, and a second flow channel communicating with the first flow channel:

the first flow channel being oriented to direct a first flow of water inhibited by the force of gravity; and the second flow channel being oriented to direct a second flow of water facilitated by the force of gravity.

2. The toilet fill valve recited in claim 1, further comprising:

a downspout coupled to the pressure regulator and being oriented in a fixed relationship with the housing to define the water flow passage so as to accommodate the second flow of water in a direction having at least a component directed toward the force of gravity.

3. The toilet fill valve recited in claim 2, wherein the downspout is coupled to the housing by the pressure regulator and forms with the pressure regulator an expansion step facilitating laminar flow within the downspout.

4. The toilet fill valve recited in claim 1, wherein the housing includes:

first portions of the housing having a first axis and being adapted for operative disposition in a generally horizontal orientation;

second portions of the housing having a second axis transverse to the fixed axis and being adapted for operative disposition in a generally vertical orientation;

the valve being disposed in the first portions of the housing; and the pressure regulator being disposed in the second portions of the housing to form the water flow passage to accommodate the water flow in the direction having at least one component opposed to the force of gravity.

5. The toilet fill valve recited in claim 1, wherein the pressure regulator includes a spiral structure providing the water flow passage with a spiral configuration in order to facilitate a pressure drop in the pressure regulator.

6. The toilet fill valve recited in claim 5, wherein the spiral structure of the pressure regulator includes:

first and second flanges each disposed in an associated radial plane; and a ramp joining the radial planes of the first and second flanges.

7. The toilet fill valve of claim 5 wherein the spiral configuration of the water flow passage is an upward spiral configuration.

8. The toilet fill valve recited in claim 1 further comprising:

portions of the pressure regulator extending into the downspout and defining a plurality of teeth angled to facilitate insertion of the pressure regulator into the downspout and to inhibit removal of the pressure regulator from the downspout.

9. The toilet fill valve recited in claim 8 wherein the first flange and the second flange are generally perpendicular to the axis and the vertical plane.

10. The toilet fill valve recited in claim 1, wherein:

the pressure regulator has an axis; and the second flow channel of the pressure regulator is defined generally along the axis of the pressure regulator.

11. The toilet fill valve recited in claim 10 wherein the first flow channel is defined outwardly of the second flow channel.

12. The toilet fill valve recited in claim 11 wherein the first flow channel surrounds the second flow channel and has the general shape of a helix.

13. The toilet fill valve recited in claim 12 wherein the axis of the second flow channel is a first axis and the helix has a second axis aligned with the first axis.

14. A toilet fill valve having a water flow passage, the valve comprising:

a housing defining a portion of the water flow passage and having a water inlet;

a pressure regulator disposed in the water flow path for reducing the pressure of the water in the water flow passage;

a spiral structure included in the pressure regulator and having an axis, the spiral structure forming the water flow passage into the shape of a spiral;

a first flange included in the spiral structure, the first flange being oriented generally in a first radial plane;

a second flange included in the spiral structure, the second flange being oriented in a second radial plane generally parallel to the first radial plane; and a ramp included in the spiral structure and disposed to connect the first flange and the second flange, the ramp extending transverse to the axis, the first plane and the second plane.

15. The toilet fill valve recited in claim 14, wherein the pressure regulator is adapted for operative disposition with the axis of the pressure regulator extending generally vertically.

16. The toilet fill valve recited in claim 14, wherein the housing comprises:

first portions adapted to be operatively disposed generally in a horizontal orientation; and second portions adapted to be operatively disposed generally in a vertical orientation.

17. The toilet fill valve recited in claim 16, wherein the pressure regulator is disposed in the second portions of the housing.

18. The toilet fill valve recited in claim 17, further comprising a valve disposed between the first portions of the housing and the second portions of the housing.

19. The toilet fill valve recited in claim 14, further comprising:

a downspout coupled to the housing and defining a portion of the water flow passage; and portions of the downspout defining at least one expansion step facilitating laminar flow in the downspout.

20. The toilet fill valve recited in claim 19, wherein:

the portion of the downspout define a first expansion step; and portions of the pressure regulator define a second expansion step with the downspout.

21. The toilet recited in claim 12 wherein the at least one expansion step further comprises a connecting surface disposed between a first wall and a second wall at acute angles to the upstream conduit and the downstream conduit.

22. The toilet recited in claim 21 wherein the connecting surface is disposed between the first wall and the second wall and is substantially perpendicular to the upstream conduit and the downstream conduit.

23. The toilet fill valve recited in claim 22, wherein:

the flow of water in the downspout is in a first direction toward the force of gravity; and the flow of water in the pressure regulator is in a second direction opposed to the first direction.

24. The toilet fill valve recited in claim 14, wherein the spiral structure is adapted to be disposed generally vertically and the water flows upwardly within the spiral structure to facilitate pressure regulation by the force of gravity.

25. The toilet recited in claim 7, further comprising:

portions of the pressure regulator extending into a unitary downspout and defining a plurality of teeth angled to facilitate insertion of the pressure regulator into the downspout and to inhibit removal of the pressure regulator from the downspout.

26. A toilet fill valve having a water flow passage, the valve comprising:

a housing defining a portion of the water flow passage and having a water inlet;

a pressure regulator disposed in the water flow passage for reducing the pressure of the water in the water flow passage;

a spiral structure included in the pressure regulator and having an axis disposed in a vertical plane dividing the spiral structure, the spiral structure forming the water flow passage into the shape of a spiral;

a first flange included in the spiral structure, the first flange having the configuration of a first plane and being generally perpendicular to the vertical plane; and a second flange included in the spiral structure, the second flange having the configuration of a second plane and being generally perpendicular the vertical plane, the second flange being coupled to the first flange.

* * * * *

UNITED STATES PATENT AND TRADEMARK OFFICE
CERTIFICATE OF CORRECTION

PATENT NO. : 6,354,326 B1
DATED : March 12, 2002
INVENTOR(S) : Le et al.

It is certified that error appears in the above-identified patent and that said Letters Patent is hereby corrected as shown below:

<u>Column 8,</u>
Line 18, please delete line 18 and substitute the following: -- 21. The toilet recited in claim 19 wherein the at least one --

Signed and Sealed this

Twenty-first Day of June, 2005

JON W. DUDAS
*Director of the United States Patent and Trademark Office*